April 18, 1961     J. B. HIRSCHMANN, JR     2,979,729
GOGGLE
Filed Feb. 12, 1958
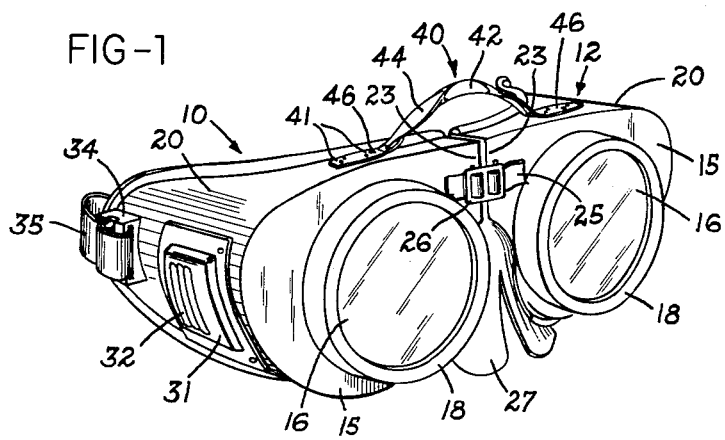
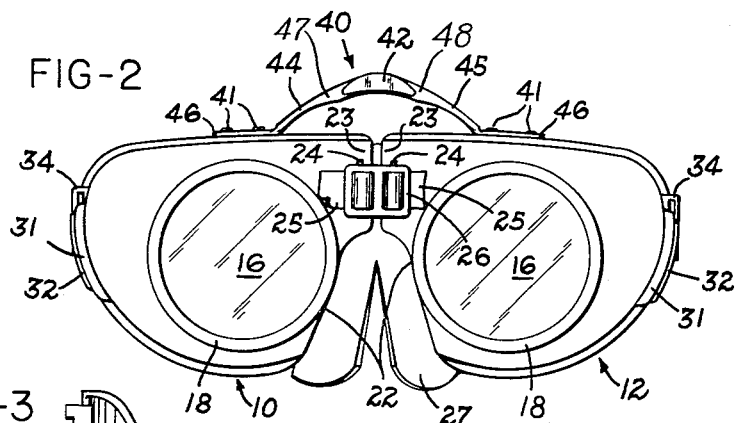
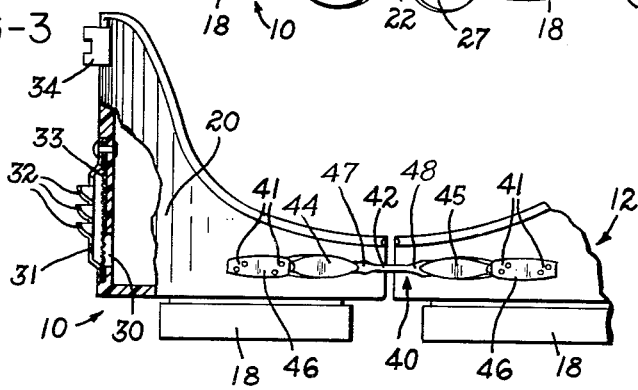
INVENTOR
BY JACK B. HIRSCHMANN, Jr.
ATTORNEYS

United States Patent Office 2,979,729
Patented Apr. 18, 1961

2,979,729

GOGGLE

Jack B. Hirschmann, Jr., Fairhaven, Mass.
(% The H. L. Bouton Co., Buzzards Bay, Mass.)

Filed Feb. 12, 1958, Ser. No. 714,875

2 Claims. (Cl. 2—14)

This application relates to goggles, and particularly of the protective type used to shield the eyes and adjacent facial parts of persons employed in welding operations.

The goggles provided by this invention are formed from a pair of complementary shaped eye cups preferably made of molded plastic material or the like, and each of these eye cups includes a lens mounted in the front surface thereof. Each eye cup includes walls extending rearwardly from the front surface and terminating in an edge which is contoured to rest along the brow, temple, and upper cheek area of the wearer and along the adjacent side of the nose. This contour can be formed generally in manufacture, but obviously cannot be formed to fit the particular facial contours of each wearer without an individual or custom built fitting. Consequently, the eye cups will not fit comfortably on all wearers and must be adjusted to the particular requirements of the individual wearer, and this is especially the case with goggles designed to be worn over conventional spectacles.

The primary object of this invention, therefore, is to provide an adjustable goggle wherein the individual eye cups may be fitted into close conformity with the facial contours of an individual wearer, and wherein the eye cups are retained in such adjusted position until forcibly readjusted. To accomplish this object the present invention provides a bridge member of work hardenable material connecting the individual eye cups and including flattened portions which define focal points for bending of the bridge member in adjusting the relative positions of the eye cups. Thus, once the eye cups have been adjusted to suit the facial contours of an individual wearer, the bridge member will tend to maintain them in such adjusted position unless the eye cups are forcibly readjusted.

Another object of the invention is to provide such a goggle wherein the flattened parts of the bridge member which focus bending thereof are so located as to maintain the lens surfaces properly aligned at all times.

Other objects and advantages of the invention will be apparent from the following description, the accompanying drawing and the appended claims.

In the drawing:

Fig. 1 is a perspective view of a welding goggle in accordance with the invention;

Fig. 2 is a front elevational view of the goggle shown in Fig. 1; and

Fig. 3 is a partial top plan view showing the top of the bridge member, with the cushioning pad omitted, and also partly broken away to show details of the ventiling means.

Referring to the drawing, which illustrates a preferred embodiment of the invention, the goggles in accordance with the invention include complementary right and left eye cups designated generally 10 and 12. Each eye cup includes a front surface 15 on which is mounted a lens 16, preferably in a removable carrier 18 which may be threaded or otherwise removably secured to the front surface 15. These lenses may incorporate suitable selective light and heat absorbing materials as required for welding goggles.

The side walls 20 of the two eye cups extend rearwardly from the front surfaces 15 and are contoured at the top, outside and bottom thereof to conform generally to the contour of the brow, temple and upper cheek of the wearer. Similarly on the inside, each eye cup is contoured at 22 to conform generally to the side of the wearer's nose, and above the edges 22 are inwardly extending parts 23 which are adapted to project toward each other above the bridge of the nose. The parts 23 are provided with slots 24 to receive straps 25, secured by a buckle 26, for retaining a conventional split pad 27 of soft leather or the like for cushioning the nose, and each eye cup is provided in its outer side wall with a suitable ventilating opening 30 covered by a light shield 31 incorporating ventilating louvers 32 and a screen 33. At the rearward outer edge of each eye cup is a lug 34 for receiving one end of an adjustable band or strap 35 for extension around the head of the wearer to hold the goggles in place.

The illustrated goggles are designed for universal use, including wearing over corresive spectacles, and it is therefore important that adequate provision be made for adjustment to provide the maximum comfort of fit, particularly if the goggles must accommodate spectacles. The invention accordingly provides a special construction such that the two eye cups are readily adjusted as desired to suit the comfort of the individual wearer, and also such that they will tend to retain this adjusted relation in subsequent use. Thus in addition to the straps 25, the eye cups are provided with a connecting bridge member 40, which is secured as by rivets 41 at its opposite ends to the top of each eye cup. At the center of this bridge member 40 there is a flattened portion 42 which is of minimum thickness and maximum width in a plane generally parallel to the plane or surface of the lenses 16, and additional flattened portions 44 and 45 are provided on opposite sides of the central portion 42 and have their minimum thickness and maximum width in planes extending transversely with respect to the plane of lenses 16.

It is an important feature of the invention that the bridge member 40 be formed of a material which is initially readily ductile but which work hardens relatively quickly. For example, highly satisfactory results have been obtained in the practice of the invention with the bridge member 40 of nickel-silver alloy, and Phosphor bronze can also be used but is of a less desirable color. Additionally the bridge member 40 is preferably formed from an initially round bar which is flattened to provide the portions 42, 44 and 45 and also the flattened end portions 46 by which it is secured to the eye cups.

As shown particularly in Figs. 2 and 3, the bridge member 40 is initially essentially straight in a vertical plane, its flattened end portions 46 are substantially centrally located above the lenses 16, and the portions 42 and 44—45 cooperate to provide an arched configuration as viewed from the front of the goggle. The eye cups can then be adjusted from this initial relative position as required to suit the comfort of the individual wearer. The particular construction of the bridge member limits this adjustment to either of two essentially axial directions, since the flattened portion 42 tends to focus any relative horizontal movement of the eye cups around a generally vertical bending axis located centrally of the goggle, and the flattened portions 44 and 45 similarly tend to focus vertical adjusting movement of the eye cups around bending axes extending generally horizontally through these portions 44 and 45. This result is further contributed to by the portions 47 and 48 of the bridge member which connect the center portion 42 with the portions 44 and 45 respectively. As shown, these portions 47 and 48 are of substantially greater minimum thickness than the portions 42, 44 and 45, a condition which is readily established if the member 40 is formed as described from an initially round bar, and the portions 47 and 48 thus resist bending of the bridge member about axes which are neither parallel with nor perpendicular to the lenses 16.

The invention accordingly assures that the eye cups are maintained at all times in properly aligned relation, and especially the bridge member of the invention prevents relative twisting between the two lenses which could otherwise introduce prism effects into the optical system. In addition, the formation of the bridge member from a work hardenable metal as described assures that once the goggle has been adjusted to the comfort of the individual wearer, it will tend to be held permanently in that adjusted position and will not require readjustment each time the goggles are worn. These features taken with the fact that the invention minimizes the possibility of relative misalignment or cocking of the lenses, provide a goggle having marked features of superiority over anything heretofore available in the art.

While the form of article herein described constitutes a preferred embodiment of the invention, it is to be understood that the invention is not limited to this precise form of article, and that changes may be made therein without departing from the scope of the invention which is defined in the appended claims.

What is claimed is:

1. A protective goggle comprising a pair of separate complementary eye cups each having a front portion, a lens mounted on said front portion of each said eye cup, side wall portions on each said cup extending rearwardly of said front portions and contoured to conform generally to the facial areas surrounding the eyes of the wearer, each of said cups including a top portion extending rearwardly of said front portion above the level of the associated said lens, a separate bridge member for connecting said eye cups including end portions engaging said top portions of said cups and secured thereto, said bridge member including a central section of substantial length and of greater width than thickness with the width thereof extending in a plane generally parallel to the plane of said lenses and located substantially equidistant from said lenses, said bridge member including an additional pair of sections of substantial length and of greater width than thickness intermediate said central section and said end portions respectively, said additional sections having the respective widths thereof extending in planes generally normal to the surfaces of said lenses, said central and additional sections providing focal points for bending of said bridge member about respectively perpendicular axes to adjust the relative positions of said cups to the particular facial contours of the wearer, said bridge member also including sections connecting said central and additional sections which are of substantially greater minimum thickness than said central and additional sections to resist bending of said bridge member about axes neither parallel with nor perpendicular to said lenses, said bridge member being formed of a material which is initially ductile but which work-hardens in response to said bending thereof to retain said eye cups in adjusted position, and means for holding said goggle in operative position on the head of the wearer.

2. A protective goggle comprising a pair of separate complementary eye cups each having a front portion, a lens mounted on said front portion of each said eye cup, side wall portions on each said cup extending rearwardly of said front portions and contoured to conform generally to the facial areas surrounding the eyes of the wearer, each of said cups including a substantially flat top portion extending rearwardly of said front portion above the level of the associated said lens, a separate bridge member connecting said eye cups, said bridge member being essentially straight as viewed in a plane parallel to the plane of said lenses and including relatively flat end portions engaging said flat top portions of said cups and secured thereto to hold said lenses initially in substantially co-planar relation, said bridge member including a central section of substantial length and of greater width than thickness with the width thereof extending in a plane generally parallel to the plane of said lenses and located substantially equidistant from said lenses, said bridge member being of generally arched configuration as viewed from the front of said goggle and including an additional pair of sections of substantial length and of greater width than thickness intermediate said central section and said end portions respectively, said additional sections having the respective widths thereof extending in planes generally normal to the surfaces of said lenses and generally oblique to said top portions of said eye cups, said central and additional sections providing focal points for bending of said bridge member about respectively perpendicular axes to adjust the relative positions of said cups to the particular facial contours of the wearer, said bridge member also including sections connecting said central and additional sections which are of substantially greater minimum thickness than said central and additional sections to resist bending of said bridge member about axes neither parallel with nor perpendicular to said lenses, said bridge member being formed of a material which is initially ductile but which work-hardens in response to said bending thereof to retain said eye cups in adjusted position, and means for holding said goggle in operative position on the head of the wearer.

References Cited in the file of this patent

UNITED STATES PATENTS

| 1,180,701 | Day | Apr. 25, 1916 |
| 1,361,150 | Gagnon | Dec. 7, 1920 |
| 2,727,237 | Malcom | Dec. 20, 1955 |

FOREIGN PATENTS

| 777,500 | Great Britain | June 26, 1957 |

UNITED STATES PATENT OFFICE
CERTIFICATE OF CORRECTION

Patent No. 2,979,729            April 18, 1961

Jack B. Hirschmann, Jr.

It is hereby certified that error appears in the above numbered patent requiring correction and that the said Letters Patent should read as corrected below.

Column 1, line 62, for "ventiling" read -- ventilating --; column 2, line 23, for "corresive" read -- corrective --.

Signed and sealed this 3rd day of October 1961.

(SEAL)
Attest:

ERNEST W. SWIDER
Attesting Officer

DAVID L. LADD
Commissioner of Patents

USCOMM-DC